United States Patent
Shoji et al.

(10) Patent No.: US 7,534,526 B2
(45) Date of Patent: May 19, 2009

(54) ALKALINE BATTERY

(75) Inventors: Yasuhiko Shoji, Osaka (JP); Ichiro Matsuhisa, Hyogo (JP); Yasushi Sumihiro, Hyogo (JP)

(73) Assignee: Panasonic Corporation, Osaka (JP)

( * ) Notice: Subject to any disclaimer, the term of this patent is extended or adjusted under 35 U.S.C. 154(b) by 134 days.

(21) Appl. No.: 11/581,340

(22) Filed: Oct. 17, 2006

(65) Prior Publication Data

US 2007/0092795 A1   Apr. 26, 2007

Related U.S. Application Data

(60) Provisional application No. 60/802,156, filed on May 22, 2006.

(30) Foreign Application Priority Data

Oct. 21, 2005   (JP)   ............... 2005-307678

(51) Int. Cl.
  *H01M 2/02*   (2006.01)
  *H01M 6/08*   (2006.01)
(52) U.S. Cl. .................. 429/164; 429/167; 429/171; 429/163
(58) Field of Classification Search ............. 429/163, 429/164, 167, 171, 181
  See application file for complete search history.

(56) References Cited

U.S. PATENT DOCUMENTS

| 5,376,467 A | * | 12/1994 | Abe et al. ............ 429/7 |
| 6,703,157 B1 | * | 3/2004 | Shoji et al. ........... 429/56 |
| 2004/0234842 A1 | | 11/2004 | Kawano et al. |

FOREIGN PATENT DOCUMENTS

| JP | 09-199106 | 7/1997 |
| JP | 2003-217596 | 7/2003 |

OTHER PUBLICATIONS

European Search Report issued in corresponding European Patent Application No. 06122168.5-1227 dated on Nov. 23, 2007.

* cited by examiner

*Primary Examiner*—Patrick Ryan
*Assistant Examiner*—Ben Lewis
(74) *Attorney, Agent, or Firm*—McDermott Will & Emery LLP (57) ABSTRACT

An alkaline battery according to the present invention includes: a battery case that houses a power generation element therein; and an assembly sealing portion that closes an opening of the battery case. The assembly sealing portion includes a negative terminal portion, a negative current collector electrically connected to the negative terminal portion, and a resin sealing body. The negative terminal portion includes a first negative terminal plate and a second negative terminal plate spaced apart from each other, and a PTC element placed between the first negative terminal plate and the second negative terminal plate.

3 Claims, 5 Drawing Sheets

ALKALINE BATTERY

RELATED APPLICATIONS

This application claims priority from Japanese Patent Application No. JP 2005-307678 filed Oct. 21, 2005 and U.S. Provisional Patent Application No. 60/802,156 filed May 22, 2006 the disclosures of which Applications are incorporated by reference herein. The benefit of the filing and priority dates of the Japanese and United States Applications is respectfully requested.

FIELD OF THE INVENTION

The present invention relates to an alkaline battery including a PTC element.

BACKGROUND OF THE INVENTION

In order to improve safety of batteries, various studies have been conducted on batteries including a PTC element that prevents rapid temperature increase of batteries in case of short circuit.

For example, Japanese Patent Laid-Open No. 2003-217596 proposes that a surface of a negative current collector is coated with an electronic conductor mainly composed of polyethylene and having a PTC function. Japanese Patent Laid-Open No. 9-199106 proposes a lithium secondary battery in which a flange of a sealing plate peripheral edge is crimped via a gasket at an opening end of an external can, including a PTC element placed between the flange of the sealing plate and the gasket.

However, in Japanese Patent Laid-Open No. 2003-217596, the electronic conductor coated on the surface of the negative current collector is easily decomposed by an alkaline electrolyte, and the PTC function is sometimes insufficiently exerted.

In an alkaline battery, a negative current collector and a negative terminal plate need to be firmly connected by electric welding or the like, and it is difficult to integrate a PTC element between the negative current collector and the negative terminal plate.

The lithium secondary battery in Japanese Patent Laid-Open No. 9-199106 has a structure of a sealing portion such as a current collector or an explosion-proof mechanism different from a structure in an alkaline battery, and thus an assembling manner of the PTC element suitable for the structure of the alkaline battery needs to be considered.

Thus, in order to solve the conventional problems, the present invention has an object to provide an alkaline battery that is high in safety and reliability and highly resistant to liquid leakage.

BRIEF SUMMARY OF THE INVENTION

The present invention provides an alkaline battery including: a battery case that houses a power generation element therein; and an assembly sealing portion that closes an opening of the battery case, and the assembly sealing portion includes a negative terminal portion, a negative current collector electrically connected to the negative terminal portion, and a resin sealing body. The sealing body includes a central cylindrical portion having a through hole through which the negative current collector is inserted, an outer peripheral cylindrical portion placed between a peripheral edge of the negative terminal portion and an opening end of the battery case, and a connecting portion that connects the central cylindrical portion and the outer peripheral cylindrical portion. The opening end of the battery case is bent so as to wrap an upper end of the outer peripheral cylindrical portion of the sealing body, and the bent portion is crimped inward to fasten the peripheral edge of the negative terminal portion. The present invention has a feature in that the negative terminal portion includes a first negative terminal plate and a second negative terminal plate spaced apart from each other, and a PTC element placed between the first negative terminal plate and the second negative terminal plate.

It is preferable that the first negative terminal plate and the second negative terminal plate each have a flange in a peripheral edge and a flat portion in a central portion, and the PTC element is placed between the flat portion of the first negative terminal plate and the flat portion of the second negative terminal plate, an insulation plate is placed between the flange of the first negative terminal plate and the flange of the second negative terminal plate, the opening end of the battery case is bent so as to wrap the upper end of the outer peripheral cylindrical portion of the sealing body, and the bent portion is crimped inward to fasten the flange of the first negative terminal plate, the flange of the second negative terminal plate, and the insulation plate.

It is preferable that the first negative terminal plate and the second negative terminal plate each have a flange in a peripheral edge and a flat portion in a central portion, the PTC element is placed between the flange of the first negative terminal plate and the flange of the second negative terminal plate, the opening end of the battery case is bent so as to wrap the upper end of the outer peripheral cylindrical portion of the sealing body,.and the bent portion is crimped inward to fasten the flange of the first negative terminal plate, the flange of the second negative terminal plate, and the PTC element.

Further, it is preferable that an insulation plate is placed between the flat portion of the first negative terminal plate and the flat portion of the second negative terminal plate.

According to the present invention, the negative terminal portion includes the two negative terminal plates and the PTC element placed therebetween, and an energization path between the two negative terminal plates is the PTC element only, thereby ensuring blocking of a short circuit by the PTC element current passed in case of short circuit and significantly preventing rapid temperature increase of the battery in case of short circuit.

The negative terminal portion is constituted by the two negative terminal plates via the PTC element, which increases a length of a rising path of an electrolyte, and causes the path to be separated, thereby preventing leakage of the electrolyte.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

An embodiment of the present invention will be described with reference to FIGS. 1 and 2.

Figure 1:
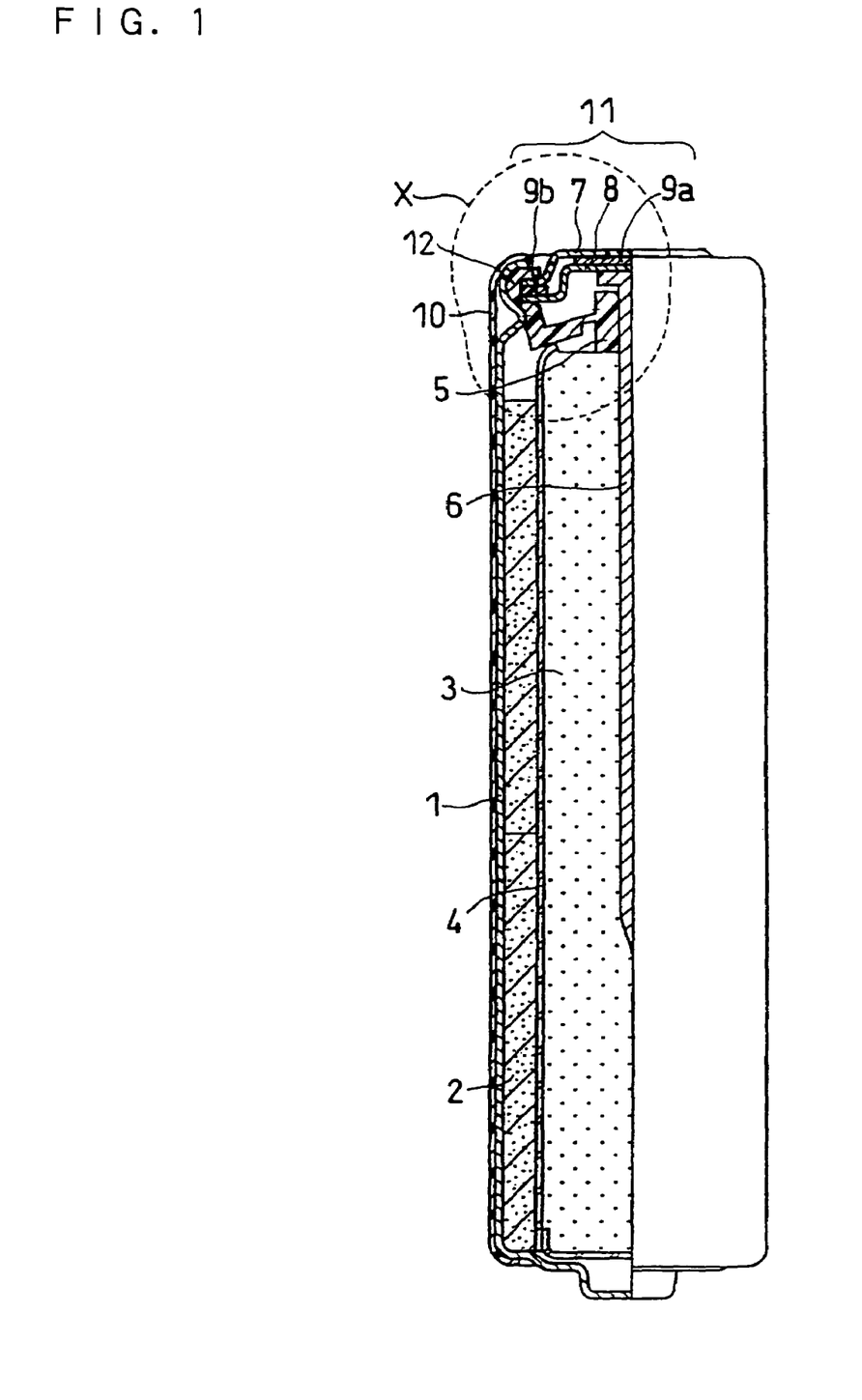
FIG. 1 is a front view, partially in section, of an alkaline battery in one embodiment of the present invention.

FIG. 1 is a front view, partially in section, of an AA alkaline battery (LR6) according to an embodiment of the present invention.

A hollow cylindrical positive electrode mixture 2 is inscribed in a closed-end cylindrical battery case 1 that also serves as a positive terminal. In a hollow portion of the positive electrode mixture 2, a gel negative electrode 3 is placed via a closed-end cylindrical separator 4. The positive electrode mixture 2, the separator 4, and the gel negative electrode 3 contain an alkaline electrolyte. Nonwoven fabric mainly composed of, for example, polyvinyl alcohol fiber and rayon fiber mixed is used as the separator 4.

The positive electrode mixture 2 includes, for example, a positive active material containing manganese dioxide powder, a conductive agent such as graphite powder, or a mixture of an alkaline electrolyte such as an aqueous potassium hydroxide solution.

The gel negative electrode 3 includes, for example, a negative active material such as zinc powder or zinc alloy powder, a gelling agent such as sodium polyacrylate, and a mixture of an alkaline electrolyte such as an aqueous potassium hydroxide solution. The zinc alloy powder highly resistant to corrosion is preferably used as the negative active material, and in an environmentally friendly manner, the zinc alloy powder does not contain any or all of mercury, cadmium, and lead. The zinc alloy includes a zinc alloy containing, for example, indium, aluminum, and bismuth.

Figure 2:
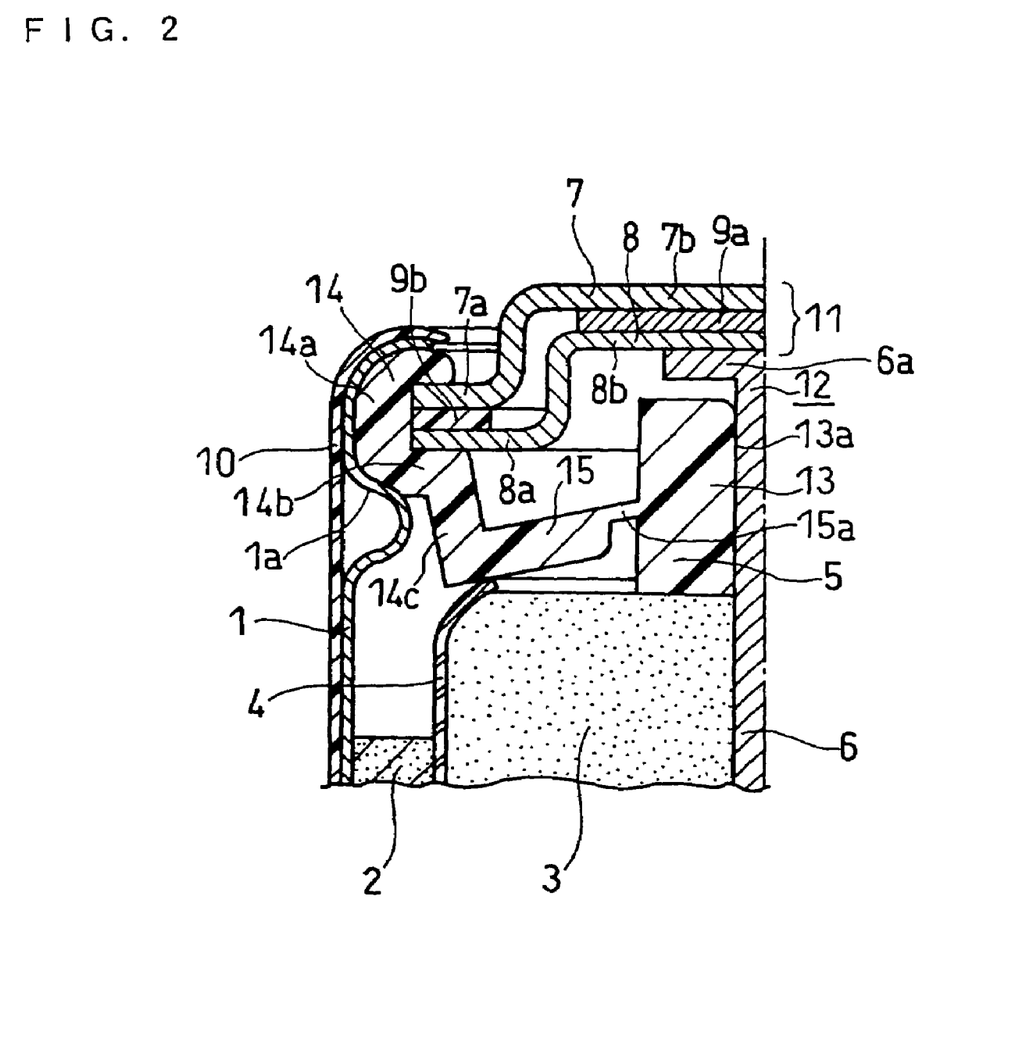
FIG. 2 is an enlarged vertical sectional view of a sealing portion (an X portion)) in FIG. 1.

FIG. 2 is an enlarged sectional view of a portion X (a sealing portion of the alkaline battery) in FIG. 1.

The battery case 1 houses a power generation element such as the positive electrode mixture 2 and is then provided with a step 1a near an opening, and the opening of the battery case 1 is sealed by an assembly sealing portion 12. The assembly sealing portion 12 includes a negative terminal portion 11, a negative current collector 6 electrically connected to the negative terminal portion 11, and a resin sealing body 5. The negative current collector 6 is inserted in the center of the gel negative electrode 3.

The sealing body 5 includes a central cylindrical portion 13 having a through hole 13a through which the negative current collector 6 is inserted, an outer peripheral cylindrical portion 14 placed between a peripheral edge of the negative terminal portion 11 and an opening end of the battery case 1, and a connecting portion 15 connecting the central cylindrical portion 13 and the outer peripheral cylindrical portion 14 and having a thin portion 15a that serves as a safety valve. The outer peripheral cylindrical portion 14 includes an annular horizontal portion 14b that receives the peripheral edge of the negative terminal portion 11, an upper cylindrical portion 14a raised upward from an outer peripheral edge of the horizontal portion 14b, and a lower cylindrical portion 14c extending downward from an inner peripheral edge of the horizontal portion 14b in a slanting direction. The opening end of the battery case 1 is bent so as to wrap an upper end of the upper cylindrical portion 14a of the sealing body 5, and the bent portion is crimped inward to fasten the peripheral edge of the negative terminal portion 11 with the step 1a. An outer surface of the battery case 1 is coated with an external label 10.

The present invention has a feature in a structure of the negative terminal portion 11 in the assembly sealing portion 12 of the alkaline battery. The negative terminal portion 11 includes a first negative terminal plate 7 and a second negative terminal plate 8 placed apart from each other, and a PTC element 9a placed between the first negative terminal plate 7 and the second negative terminal plate 8.

Specifically, as shown in FIG. 2, the first negative terminal plate 7 has a flange 7a in a peripheral edge and a flat portion 7b in a central portion, and the second negative terminal plate 8 has a flange 8a in a peripheral edge and a flat portion 8b in a central portion. The PTC element 9a is placed between the flat portion 7b of the first negative terminal plate 7 and the flat portion 8b of the second negative terminal plate 8, and an insulation plate 9b is placed between the flange 7a of the first negative terminal plate 7 and the flange 8a of the second negative terminal plate 8. The opening end of the battery case 1 is bent so as to wrap an upper end of the upper cylindrical portion 14a of the sealing body 5, and the bent portion is crimped inward to fasten the flange 7a of the first negative terminal plate 7, the flange 8a of the second negative terminal plate 8, and the insulation plate 9b. The negative current collector 6 is physically and electrically connected by welding a head 6a thereof to the flat portion 8b of the second negative terminal plate 8. The PTC element 9a has a function of rapidly increasing resistance when reaching predetermined temperature.

The disk-shaped PTC element 9a has, for example, a thickness of 0.2 to 0.4 mm and a diameter of 5 to 7.5 mm.

The ring-shaped insulation plate 9b has, for example, a thickness of 0.2 to 0.4 mm, an inner diameter of 5 to 8 mm, and an outer diameter of 11 to 12 mm.

In order to ensure prevention of a phenomenon in which the first negative terminal plate 7 and the second negative terminal plate 8 come into direct contact with each other to cause a current to pass without the PTC element 9a, and the PTC element 9a does not function and cannot block the current, the first negative terminal plate 7 and the second negative terminal plate 8 are preferably placed so that a boundary between the flange 7a and the flat portion 7b of the first negative terminal plate 7, and a boundary between the flange 8a and the flat portion 8b of the second negative terminal plate 8 are spaced 0.2 to 1 mm apart.

In the alkaline battery, an energization path between the first negative terminal plate 7 and the second negative terminal plate 8 is constituted by the PTC element 9a only as described above. Thus, when the battery is externally short-circuited to cause a short circuit current to pass and cause battery temperature to reach predetermined temperature, resistance of the PTC element is increased to ensure reduction in the short circuit current. Specifically, rapid temperature increase of the battery in case of external short circuit can be prevented. The PTC element is made of, for example, a material commercially available under the trade name of Polyswitch produced by Tyco Electronics Raychem.

The insulation plate 9b is made of, for example, paper or resin such as polypropylene.

The first negative terminal plate 7 is made of, for example, nickel-plated steel sheet.

The second negative terminal plate 8 is preferably made of tin-plated steel sheet or nickel-plated steel sheet in terms of low contact resistance.

The first and second negative terminal plates 7 and 8 have holes (not shown) for discharging gas out of the battery, for example, in the boundary between the flange 7a and the flat portion 7b and the boundary between the flange 8a and the flat portion 8b. When internal pressure of the battery is abnormally increased, the thin portion 15a of the sealing body 5 is broken to discharge the gas out of the holes.

As shown in FIG. 2, the negative terminal portion 11 is constituted by the two negative terminal plates 7 and 8, which increases a length of a rising path of the electrolyte, and causes the path to be easily separated, thereby preventing leakage of the electrolyte.

In the structure in FIG. 2, the PTC element can ensure larger contact areas with the two negative terminal plates than structures in FIGS. 3 and 4 described below, thereby reducing internal resistance in normal use of the battery, and achieving satisfactory high rate discharge performance.

Figure 3:
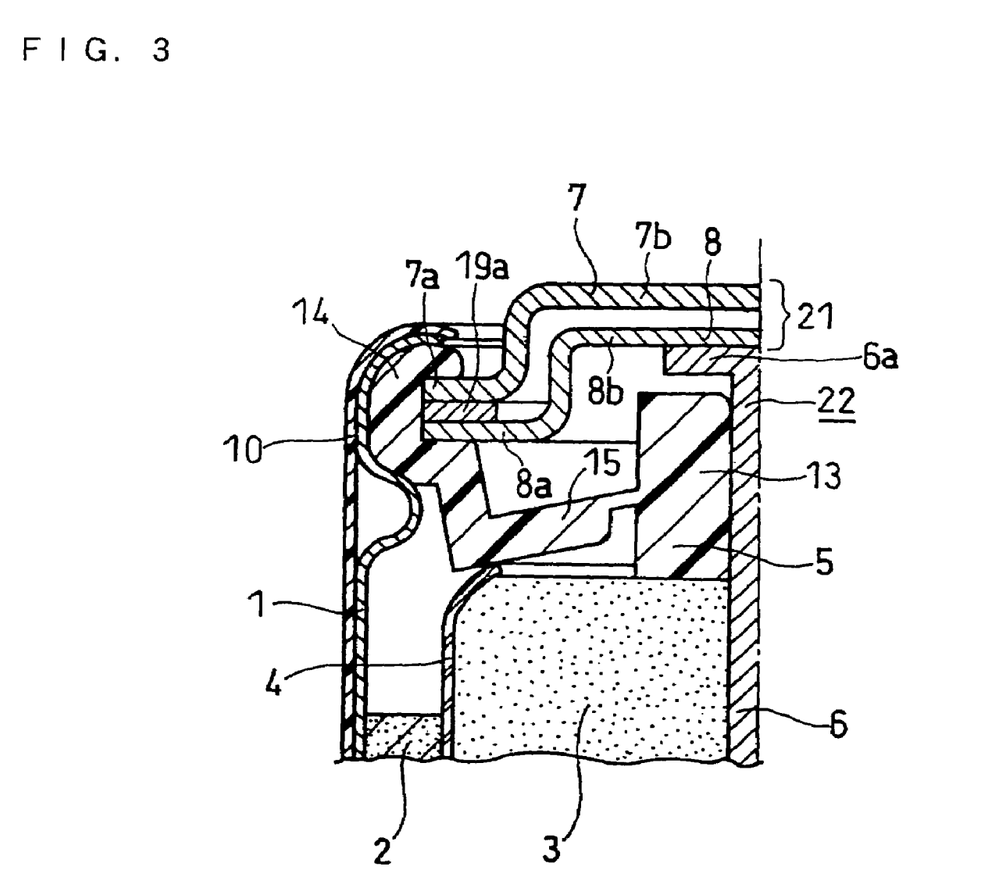
FIG. 3 is a vertical sectional view of a sealing portion in another embodiment of the present invention.

Another preferred embodiment of the present invention is shown in FIG. 3. A negative terminal portion 21 in an assembly sealing portion 22 includes a first negative terminal plate 7 and a second negative terminal plate 8 spaced apart from each other, and a ring-shaped PTC element 19a placed between a flange 7a of the first negative terminal plate 7 and a flange 8a of the second negative terminal plate 8. An opening end of the battery case 1 is bent so as to wrap an upper end of an upper cylindrical portion 14 of a sealing body 5, and the bent portion is crimped inward to fasten the flange 7a of the first negative terminal plate 7, the flange 8a of the second negative terminal plate 8, and the PTC element 19a. This fastening allows low electrical contact resistance between the PTC element 19a and the negative terminal plates 7 and 8 to be maintained.

The ring-shaped PTC element 19a has, for example, a thickness of 0.2 to 0.4 mm, an inner diameter of 5 to 8 mm, and an outer diameter of 11 to 12 mm.

In order to ensure prevention of a phenomenon in which the first negative terminal plate 7 and the second negative terminal plate 8 come into direct contact with each other to cause a current to pass without the PTC element 19a, and the PTC element does not function and cannot block the current, the first negative terminal plate 7 and the second negative terminal plate 8 are preferably placed so that the flat portion 7b and the flat portion 8b are spaced 0.2 to 1 mm apart.

Figure 4:
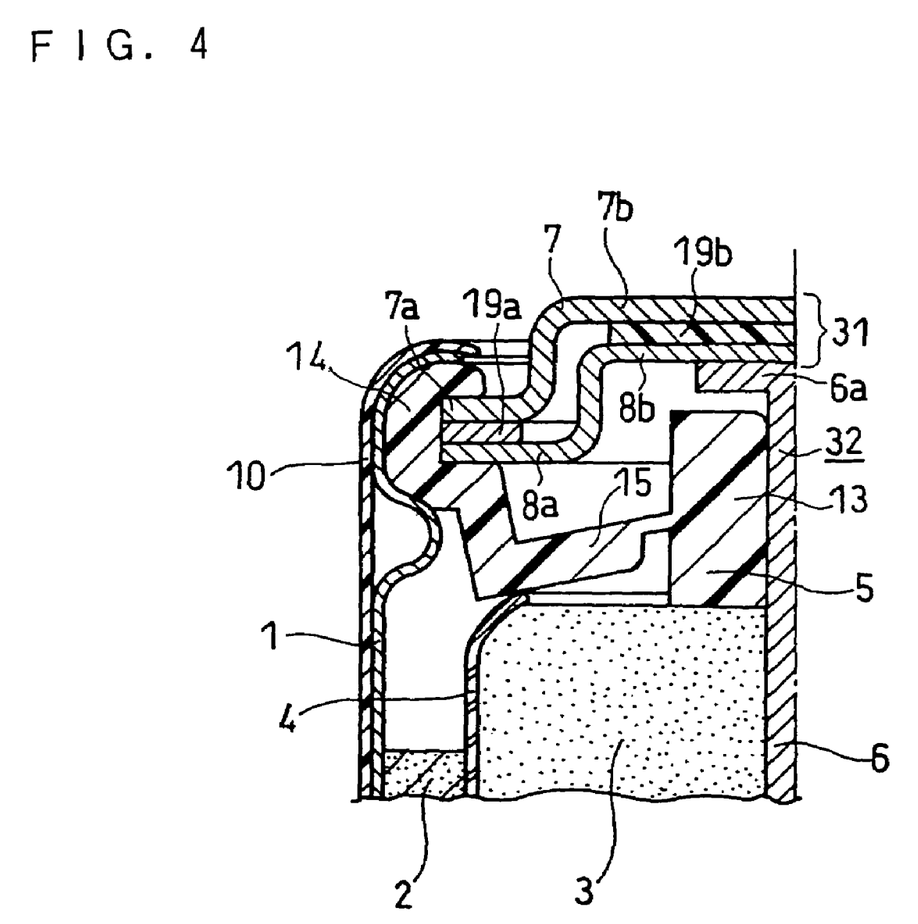
FIG. 4 is a vertical sectional view of a sealing portion in a yet another embodiment of the present invention.

A further preferred embodiment of the present invention is shown in FIG. 4. A negative terminal portion 31 in an assembly sealing portion 32 has a structure in which an insulation plate 19b is placed between the flat portion 7b of the first negative terminal plate 7 and the flat portion 8b of the first negative terminal plate 8, in the configuration of the negative terminal portion 21 in FIG. 3.

Now, examples of the present invention will be described in detail, but the present invention is not limited to the examples.

EXAMPLE 1

(1) Preparation of Positive Electrode Mixture

Manganese dioxide powder (having a mean particle size of 35 μm) and graphite powder (having a mean particle size of 15 μm) were mixed at the weight ratio of 90:10. Then, the mixture and 36% by weight of aqueous potassium hydroxide solution as an alkaline electrolyte were mixed at the weight ratio of 100:3, sufficiently stirred, and then compressed and formed into flakes. Then, the flake positive electrode mixture was ground into granules, the granules were classified by a sieve, and granules of 10 to 100 mesh were pressurized and formed into a hollow cylindrical shape to obtain a pellet positive electrode mixture.

(2) Preparation of Gel Negative Electrode

Sodium polyacrylate as a gelling agent, 36% by weight of aqueous potassium hydroxide solution as an alkaline electrolyte, and a negative active material were mixed at the weight ratio of 1:33:66 to obtain a gel negative electrode. As the negative active material, zinc alloy powder (having a mean particle size of 135 μm) was used containing 0.025% by weight of indium, 0.015% by weight of bismuth, and 0.004% by weight of aluminum, and containing no mercury and lead.

(3) Assembly of Cylindrical Alkaline Battery

An AA alkaline battery (LR6) having the structure in FIG. 1 was prepared by the following procedure. FIG. 1 is a front view, partially in section, of a cylindrical alkaline battery. FIG. 2 is an enlarged sectional view of a portion X (a sealing portion) in FIG. 1.

Two positive electrode mixtures 2 obtained from above were inserted into the battery case 1, the positive electrode mixtures 2 were pressurized by a pressure jig and brought into tight contact with an inner wall of the battery case 1. A closed-end cylindrical separator 4 was placed in the center of the positive electrode mixtures 2 in tight contact with the inner wall the battery case 1. A predetermined amount of aqueous solution containing 36% by weight of potassium hydroxide as an alkaline electrolyte was injected into the separator 4. After the lapse of predetermined time, the gel negative electrode 3 obtained from above was charged inside the separator 4. Nonwoven fabric mainly composed of polyvinyl alcohol fiber and rayon fiber mixed was used as the separator 4.

The battery case 1 housing a power generation element such as the positive electrode mixture 2 was sealed as described below using an assembly sealing portion 12.

A head 6a of a negative current collector 6 and a flat portion 8b of a second negative terminal plate 8 made of a 0.2 mm thick tin-plated steel sheet were electrically welded, and the negative current collector 6 was inserted through a through hole 13a in a central cylindrical portion 13 of a nylon sealing body 5 to obtain an intermediate of the assembly sealing portion.

The battery case 1 was formed with a groove near an opening thereof to form a step 1a, and the intermediate was placed in the opening of the battery case 1 so that a horizontal portion 14b of the intermediate was received on the step 1a. At this time, part of the negative current collector 6 was inserted into the gel negative electrode 3. Then, a ring-shaped insulation plate 9b (having a thickness of 0.3 mm, an inner diameter of 8 mm, and an outer diameter of 11 m) made of polypropylene was placed on a flange 8a of the second negative terminal plate 8 of the intermediate. A disk-shaped PTC element 9a (Polyswitch produced by Tyco Electronics Raychem) having a thickness of 0.3 mm and a diameter of 7.2 mm was placed on the flat portion 8b of the second negative terminal plate 8 of the intermediate. Further, a first negative terminal plate 7 made of a 0.4 mm thick nickel-plated steel sheet was placed on the PTC element 9a and the insulation plate 9b so that the flat portion 7b corresponds to the PTC element 9a and the flange 7a corresponds to the insulation plate 9b. The resistance of the PTC element 9a is 0.03Ω at 20° C., but significantly increased to $10^4$Ω at high temperature of 120° C.

Thus, a negative terminal portion 11 was configured in which the PTC element 9a was placed between the flat portion 7b of the first negative terminal plate 7 and the flat portion 8b of the second negative terminal plate 8, and the insulation plate 9b was placed between the flange 7a of the first negative terminal plate and the flange 8a of the second negative terminal plate 8. Then, an opening end of the battery case 1 was bent to wrap an upper end of an upper cylindrical portion 14a of a sealing body 5, and the bent portion was crimped to fasten a peripheral edge of the negative terminal portion 11 by the opening end of the battery case 1 via an outer peripheral cylindrical portion 14 to seal the opening of the battery case 1. An outer surface of the battery case 1 was coated with an external label 10.

EXAMPLE 2

An alkaline battery was prepared in the same manner as in Example 1 except that a ring-shaped PTC element 19a (having a thickness of 0.3 mm, an outer diameter of 11 mm, and an inner diameter of 8 mm) of the same material as in Example 1 is placed between a flange 7a of a first negative terminal plate 7 and a flange 8a of a second negative terminal plate 8.

COMPARATIVE EXAMPLE 1

Figure 5:
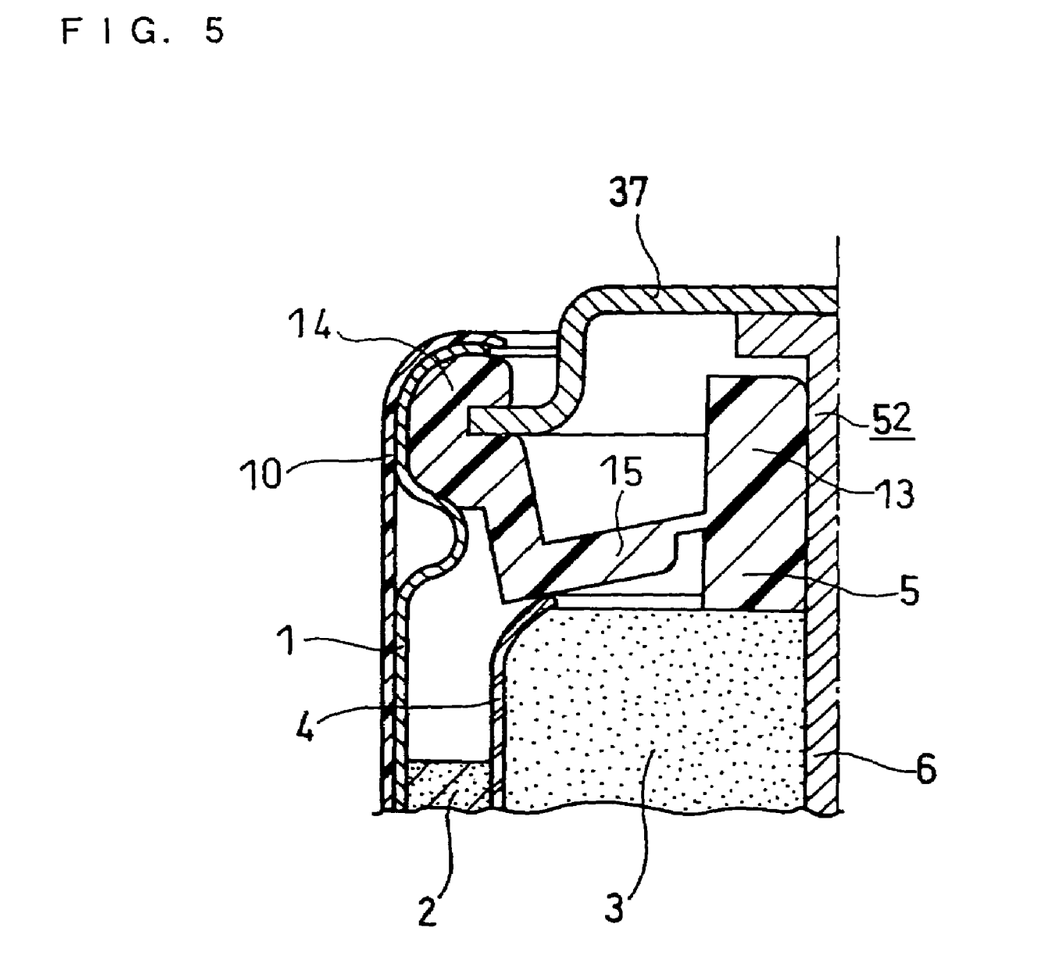
FIG. 5 is a vertical sectional view of a sealing portion of a conventional alkaline battery.

An alkaline battery was prepared in the same manner as in Example 1 except that a negative terminal portion was constituted by a first negative terminal plate 37 only as shown in FIG. 5.

COMPARATIVE EXAMPLE 2

Ninety parts by weight of powder of electronically conductive material having a PTC function and mainly composed of polyethylene having a conductivity of 5 S/cm at room temperature, and a conductivity of 5 μS/cm at 120° C. (operation temperature), and 10 parts by weight of polyvinylidene fluoride as a binder were dispersed in N-methylpyrrolidinone to obtain paste. A head 6a of a negative current collector 6 and a flat portion 17b of a first negative terminal plate 17 were welded, then the paste was applied on the entire surface of the negative current collector 6, and dried at 60° C. for 12 hours. An alkaline battery was prepared in the same manner as in Comparative Example 1 except using the negative current collector.

[Evaluations]

(1) Evaluation of Resistance to Liquid Leakage of Battery

For each of the batteries obtained from above, a hundred batteries were prepared and kept for three months in hot and humid environment at the temperature of 60° C. and the humidity of 90%, and the percentage of occurrence of liquid leakage in the batteries after the keeping was checked.

(2) Short Circuit Test of Battery

For each of the batteries obtained from above, a battery case and a first negative terminal plate were connected by a 0.1 mm thick nickel lead to externally short-circuit the battery. Surface temperature of a battery barrel was measured by a thermocouple to check the maximum temperature on the surface of the battery.

(3) Measurement of Internal Resistance of Battery

For each of the batteries obtained from above, a voltage across terminals when an AC current of 1 kHz was passed through the battery was measured by DIGITAL MILLIOHM METER VP-2811A produced by Matsushita Communications Industrial Co., Ltd. to check internal resistance of the battery.

The evaluation results are shown in Table 1.

TABLE 1

|  | Percentage of batteries with liquid leakage (%) | Maximum temperature of battery in case of short circuit (° C.) | Internal resistance of battery (mΩ) |
| --- | --- | --- | --- |
| Ex. 1 | 0 | 78 | 137 |
| Ex. 2 | 0 | 75 | 145 |
| Com. Ex. 1 | 7 | 131 | 130 |
| Com. Ex. 2 | 9 | 73 | 151 |

For the battery in Comparative Example 1 including no PTC element, battery temperature was significantly increased in case of external short circuit, and batteries with liquid leakage were found after the batteries were kept in hot and humid environment.

For the battery in Comparative Example 2, increase in battery temperature in case of external short circuit was significantly prevented immediately after assembly of the battery. However, the same short circuit test was conducted after the battery was kept at room temperature for three months, and the result was that the maximum temperature of the battery in case of short circuit was 125° C. and the battery temperature was significantly increased. This is because the PTC element is placed in contact with an electrolyte in a power generation element, and an electronic conductor having a PTC function provided on a surface of a negative current collector is decomposed by the contact with the alkaline electrolyte during keeping to prevent exertion of the PTC function. Also, batteries with liquid leakage were found after the batteries were kept in hot and humid environment.

For the batteries in Examples 1 and 2, increase in battery temperature in case of external short circuit was significantly prevented. Comparing the batteries in Examples 1 and 2, the PTC element can ensure larger contact areas with the negative terminal plates in the battery in Example 1, thereby reducing the value of internal resistance of the battery.

The alkaline battery according to the present invention has high reliability and is suitably used for power supplies of electronic equipment or portable equipment or the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An alkaline battery comprising:
a battery case that houses a power generation element therein; and
an assembly sealing portion that closes an opening of said battery case,
said assembly sealing portion including a negative terminal portion, a negative current collector electrically connected to said negative terminal portion, and a resin sealing body,
said sealing body including a central cylindrical portion having a through hole through which said negative current collector is inserted, an outer peripheral cylindrical portion placed between a peripheral edge of said negative terminal portion and an opening end of said battery case, and a connecting portion that connects said central cylindrical portion and said outer peripheral cylindrical portion, and wherein said negative terminal portion comprises a first negative terminal plate and a second negative terminal plate spaced apart from each other, and a PTC element placed between said first negative terminal plate and said second negative terminal plate, and said connecting portion has a thin portion serving as a safety valve, wherein said first negative terminal plate and said second negative terminal plate each have a flange in a peripheral edge, a flat portion in a central portion, and a boundary portion between said flange and said flat portion, said PTC element is placed between the flat portion of said first negative terminal plate and the flat portion of said second negative terminal plate, an insulation plate is placed between the flange of said first negative terminal plate and the flange of said second negative terminal plate, the opening end of said battery case is bent so as to wrap the upper end of the outer peripheral cylindrical portion of said sealing body, and the bent portion is crimped inward to fasten the flange of said first negative terminal plate, the flange of said second negative terminal plate, and said insulation plate, wherein said first negative terminal plate and said second negative terminal plate have a substantially identical shape, the boundary portion of said first negative terminal plate and the boundary portion of said second negative terminal plate each have a hole for discharging a gas out of said battery, and are spaced 0.2 to 1 mm apart.

2. An alkaline battery comprising:

a battery case that houses a power generation element therein; and an assembly sealing portion that closes an opening of said battery case, said assembly sealing portion including a negative terminal portion, a negative current collector electrically connected to said negative terminal portion, and a resin sealing body, said sealing body including a central cylindrical portion having a through hole through which said negative current collector is inserted, an outer peripheral cylindrical portion placed between a peripheral edge of said negative terminal portion and an opening end of said battery case, and a connecting portion that connects said central cylindrical portion and said outer peripheral cylindrical portion, and wherein said negative terminal portion comprises a first negative terminal plate and a second negative terminal plate spaced apart from each other, and a PTC element placed between said first negative terminal plate and said second negative terminal plate, and said connecting portion has a thin portion serving as a safety valve, wherein said first negative terminal plate and said second negative terminal plate each have a flange in a peripheral edge, a flat portion in a central portion, and a boundary portion between said flange and said flat portion, said PTC element is placed between the flange of said first negative terminal plate and the flange of said second negative terminal plate, the opening end of said battery case is bent so as to wrap the upper end of the outer peripheral cylindrical portion of said sealing body, and the bent portion is crimped inward to fasten the flange of said first negative terminal plate, the flange of said second negative terminal plate, and said PTC element, wherein said first negative terminal plate and said second negative terminal plate have a substantially identical shape, the boundary portion of said first negative terminal plate and the boundary portion of said second negative terminal plate each have a hole for discharging a gas out of said battery, and are spaced 0.2 to 1 mm apart.

3. The alkaline battery in accordance with claim 2, wherein an insulation plate is placed between the flat portion of said first negative terminal plate and the flat portion of said second negative terminal plate.

* * * * *